United States Patent
Zhai et al.

(10) Patent No.: US 9,193,039 B2
(45) Date of Patent: Nov. 24, 2015

(54) ANTI-CLOGGING MESH ABRASIVE CLOTH

(71) Applicant: Zibo Riken MT Coated Abrasives Co., Zibo, Shandong (CN)

(72) Inventors: Jianchang Zhai, Zibo (CN); Xia Meng, Zibo (CN); Huanming Xu, Zibo (CN)

(73) Assignee: Zibo Riken MT Coated Abrasives Co., Zibo (CN)

( * ) Notice: Subject to any disclaimer, the term of this patent is extended or adjusted under 35 U.S.C. 154(b) by 0 days.

(21) Appl. No.: 14/242,439

(22) Filed: Apr. 1, 2014

(65) Prior Publication Data

US 2014/0302760 A1    Oct. 9, 2014

(30) Foreign Application Priority Data

Apr. 3, 2013   (CN) .................. 2013 2 0163838 U

(51) Int. Cl.
  *B24D 11/02*   (2006.01)
  *B24D 3/00*   (2006.01)
(52) U.S. Cl.
  CPC .............. *B24D 11/02* (2013.01); *B24D 3/002* (2013.01)
(58) Field of Classification Search
  CPC ...... B24D 11/00; B24D 11/005; B24D 13/14; B24D 7/04; B24D 9/08
  USPC .............................. 451/526–539; 51/293–294
  See application file for complete search history.

(56) References Cited

U.S. PATENT DOCUMENTS

| | | | | |
|---|---|---|---|---|
| 1,884,436 A * | 10/1932 | Weil | ............................... | 451/536 |
| 2,376,254 A * | 5/1945 | Humphrey et al. | ............. | 51/309 |
| 2,665,528 A * | 1/1954 | Sternfield et al. | ............. | 401/196 |
| 2,740,239 A * | 4/1956 | Ball et al. | ...................... | 451/536 |
| 2,984,052 A * | 5/1961 | Mueller, Jr. | .................... | 451/536 |
| 3,058,819 A * | 10/1962 | Paulson | .......................... | 51/295 |
| 3,230,672 A * | 1/1966 | Anthon | .......................... | 451/536 |
| 3,353,308 A * | 11/1967 | Zane | .............................. | 451/529 |
| 3,619,843 A * | 11/1971 | Richter et al. | ............. | 15/104.93 |
| 3,688,453 A * | 9/1972 | Legacy et al. | ................. | 451/532 |
| 4,609,581 A | 9/1986 | Ott | | |
| 4,933,224 A | 6/1990 | Hatch | | |
| 4,949,511 A * | 8/1990 | Endo et al. | ...................... | 51/295 |
| 5,236,472 A | 8/1993 | Kirk et al. | | |
| 5,254,194 A | 10/1993 | Ott et al. | | |
| 5,417,726 A | 5/1995 | Stout et al. | | |
| 5,454,750 A | 10/1995 | Cosmano et al. | | |
| 5,490,878 A | 2/1996 | Peterson et al. | | |
| 5,810,650 A * | 9/1998 | Jost | ............................... | 451/527 |
| 5,954,844 A | 9/1999 | Law et al. | | |
| 6,039,775 A | 3/2000 | Ho et al. | | |
| 6,056,794 A | 5/2000 | Stoetzel et al. | | |

(Continued)

*Primary Examiner* — George Nguyen

(74) *Attorney, Agent, or Firm* — Fenwick & West LLP

(57) ABSTRACT

The disclosure relates to an anti-clogging mesh abrasive cloth, which is one type of coated abrasive tool. The anti-clogging mesh abrasive cloth comprises a substrate, a prime adhesive coating layer painted on the substrate, an abrasive layer planted on the prime adhesive coating layer, and a deposited adhesive coating layer covering on top of the abrasive layer. The substrate of the anti-clogging mesh abrasive cloth is mesh cloth with a plurality of uniformly distributed large meshes and small meshes. The large meshes can facilitate discharge of chips generated during grinding. The small meshes allow the plane around the large meshes to be anti-clogging. The combination of the large meshes and the small meshes makes the anti-clogging mesh abrasive cloth anti-clogging and suitable for grinding the materials apt to causing blockage while being grinded, such as wood, paint and putty.

7 Claims, 3 Drawing Sheets

(56) References Cited

U.S. PATENT DOCUMENTS

| | | | |
|---|---|---|---|
| 6,077,581 A * | 6/2000 | Kuramochi et al. | 428/64.1 |
| 6,190,246 B1 * | 2/2001 | Parrott et al. | 451/540 |
| 6,197,076 B1 | 3/2001 | Braunschweig et al. | |
| 7,393,371 B2 | 7/2008 | O'Gary et al. | |
| 7,628,829 B2 * | 12/2009 | Woo et al. | 51/295 |
| 8,215,051 B2 * | 7/2012 | Alexander et al. | 43/132.1 |
| 2001/0001088 A1 | 5/2001 | Chesley et al. | |
| 2002/0019206 A1 | 2/2002 | Deka et al. | |
| 2002/0026752 A1 | 3/2002 | Culler et al. | |
| 2003/0121212 A1 * | 7/2003 | Minick et al. | 51/295 |
| 2003/0217517 A1 * | 11/2003 | Allison et al. | 51/298 |
| 2005/0079802 A1 | 4/2005 | Saunier et al. | |
| 2005/0282480 A1 * | 12/2005 | Nelson et al. | 451/530 |
| 2006/0280908 A1 | 12/2006 | Hoglund | |
| 2007/0037500 A1 * | 2/2007 | Minick et al. | 451/533 |
| 2007/0287366 A1 * | 12/2007 | Sanders et al. | 451/526 |
| 2008/0102720 A1 | 5/2008 | Rostal et al. | |
| 2008/0220701 A1 | 9/2008 | Feng et al. | |
| 2009/0280734 A1 | 11/2009 | Kim | |
| 2010/0011672 A1 | 1/2010 | Kincaid et al. | |
| 2010/0107509 A1 * | 5/2010 | Guiselin | 51/298 |
| 2010/0112920 A1 * | 5/2010 | Usui et al. | 451/539 |
| 2010/0203282 A1 | 8/2010 | Keipert | |
| 2011/0034115 A1 * | 2/2011 | Chao et al. | 451/536 |
| 2013/0309952 A1 | 11/2013 | Gottardelli | |

* cited by examiner

ANTI-CLOGGING MESH ABRASIVE CLOTH

CROSS-REFERENCE TO RELATED APPLICATION

This application claims the priority of Chinese Patent Application No. 201320163838.3, filed Apr. 3, 2013, which is incorporated herein by reference.

FIELD OF DISCLOSURE

The disclosure relates generally to the field of coated abrasive tools, and specifically to an anti-clogging mesh abrasive cloth.

DESCRIPTION OF RELATED ART

Presently, there are two kinds of abrasive papers or cloths with anti-clogging effect. One kind is an abrasive paper or cloth coated with an anti-clogging coating. The other kind is net abrasive cloth. However, while the abrasive papers with the anti-clogging coating have the anti-clogging effect, the anti-clogging effect will decrease with the increasing of grinding time. In addition, the currently existing net abrasive cloth is mainly made of glass fiber. Therefore, during the grinding, the effect of grinding is mainly achieved by line stress around the nets, but not by the plane stress, and thus the abrasive materials participating in grinding are few, and easily come off.

SUMMARY

The invention overcomes the deficiencies of the prior art to provide an anti-clogging abrasive cloth which has anti-clogging function, a large grinding area, and a long life length of grinding.

The anti-clogging mesh abrasive cloth comprises a substrate, a prime adhesive coating layer painted on the substrate, an abrasive layer planted on the prime adhesive coating layer, a deposited adhesive coating layer covering the abrasive layer, and an anti-clogging coating layer on the topmost. In addition, the substrate of the anti-clogging mesh abrasive cloth is mesh cloth that has multiple large meshes and small meshes alternated with one another. In one embodiment, the large and small meshes of the mesh cloth are made by weaving.

In one embodiment, the mesh cloth (i.e., the substrate) is made from a cloth selected from the group consisting of nylon cloth, cotton cloth, blending cloth, acrylic cloth, polyester fiber cloth, bonding cloth and linen cloth.

In one embodiment, the diameters of the large meshes are in the range of 0.1 millimeter (mm)-10 mm, and the diameters of the small meshes are in the range of 0.01 mm-0.08 mm.

In one embodiment, the shapes of the large meshes and small meshes are one or more of the following shapes including circle, ellipse, polygon and irregular shape. In another embodiment, the shapes of the large meshes and small meshes can be any one or more combinations of the above-described shapes.

The abrasive layers can be planted on one surface the substrate, or on both of the two surfaces of the substrate.

As described previously, an anti-clogging coating layer can be painted on top of the deposited adhesive coating layer. The main components of the anti-clogging coating layer are resin binders and anti-clogging functional materials.

In one embodiment, the prime and deposited adhesive coating layers comprise material selected from the group consisting of phenolic resin, epoxy resin, urea-formaldehyde resin, polyvinyl alcohol (PVA), latex and any combinations thereof.

The abrasive layer comprises material selected from the group consisting particles of brown fused alumina, silicon carbide, calcined brown alumina, semi brittle alumina, diamond, ceramics and any combinations thereof.

Compared with the prior art, the invention has a variety of benefits. For example, the invention uses a mesh cloth as the substrate that has multiple large meshes and small meshes alternated with one another, where the large and small meshes of the cloth are made by weaving. Accordingly, the cost of the anti-clogging mesh abrasive cloth is low. Further, the design of the invention makes the area of the grinding larger than those of any other net abrasive cloths. In addition, the large meshes can facilitate discharge of chips generated during grinding. The small meshes allow the plane around the large meshes to be anti-clogging. The combination of the large meshes and the small meshes makes the anti-clogging mesh abrasive cloth anti-clogging and suitable for grinding the materials apt to causing blockage while being grinded, such as wood, paint and putty.

Figure 1:
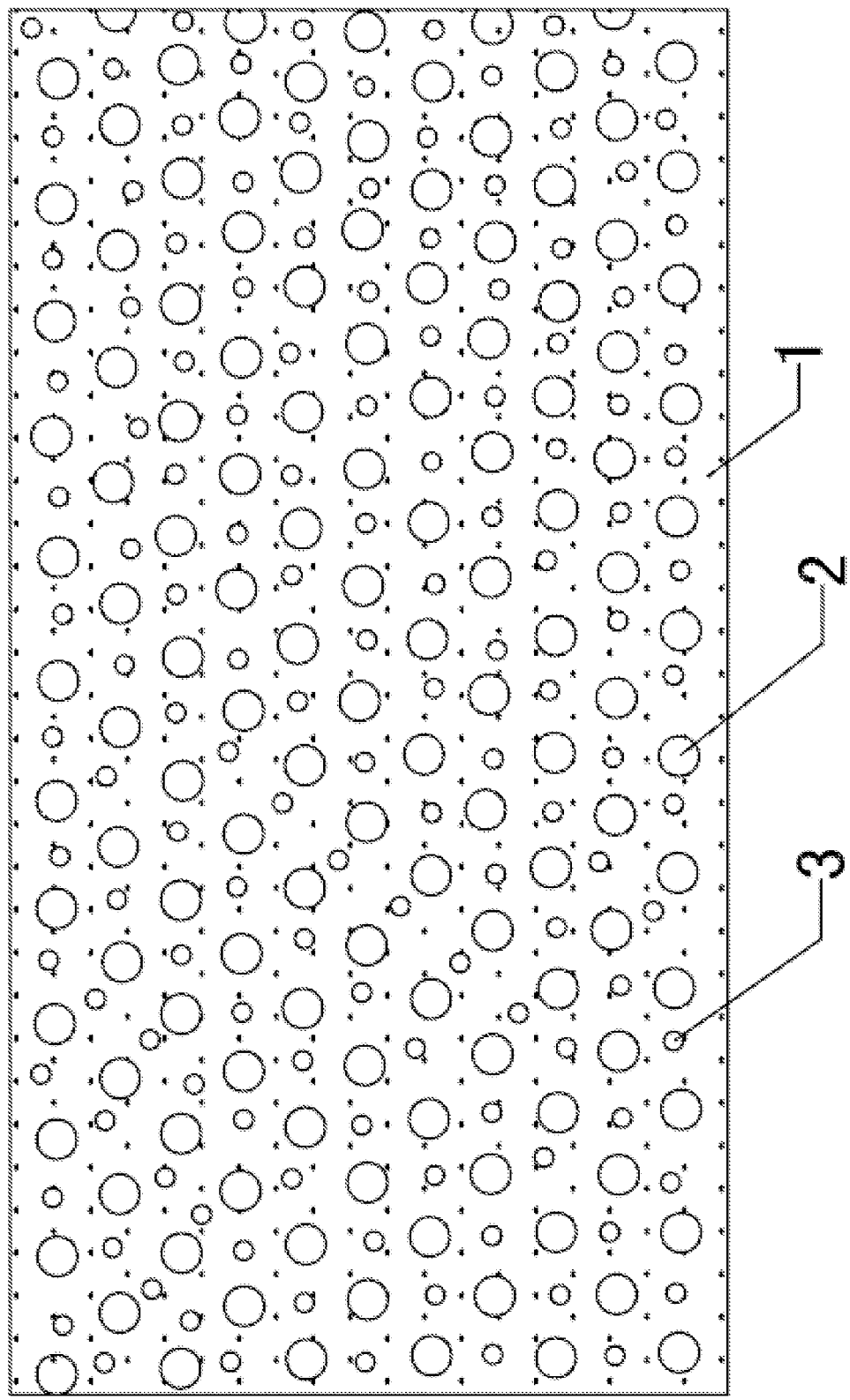
FIG. 1 is a diagram illustrating a plain view of the substrate of the anti-clogging mesh abrasive cloth according to an embodiment.
Figure 2:
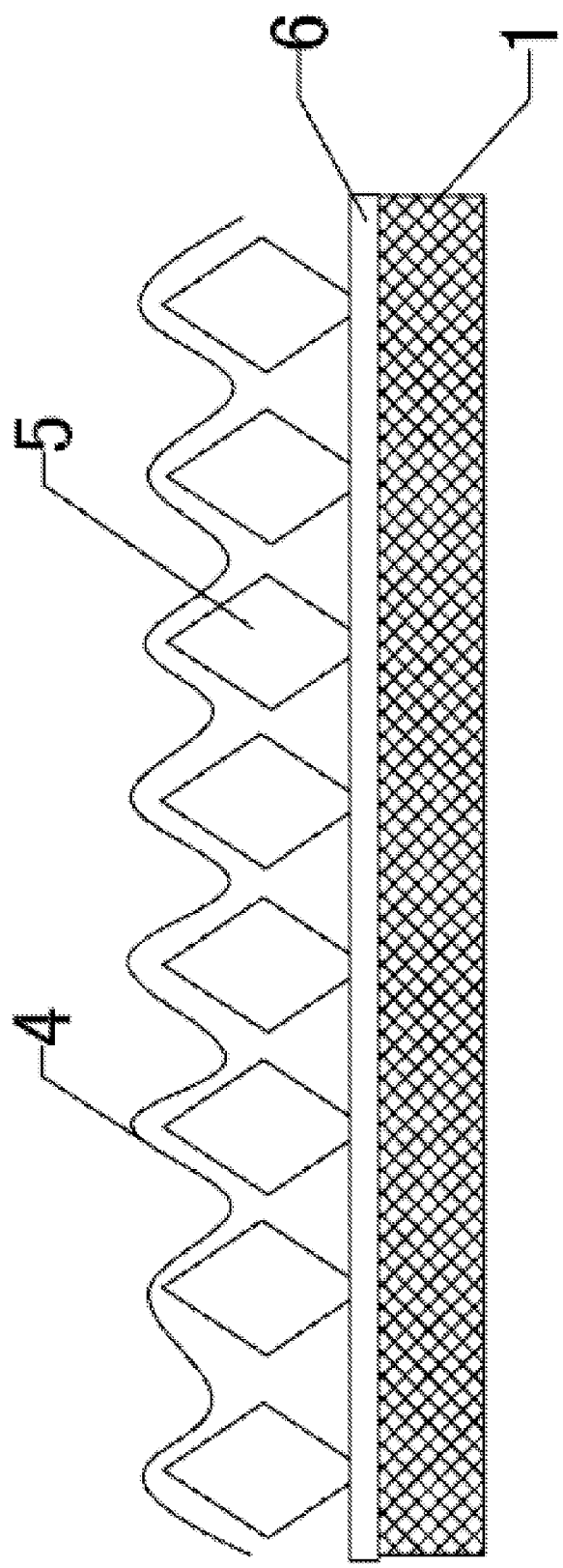
FIG. 2 is a structure diagram of the anti-clogging mesh abrasive cloth with one abrasive layer planted on one side of the cloth according to an embodiment.
Figure 3:
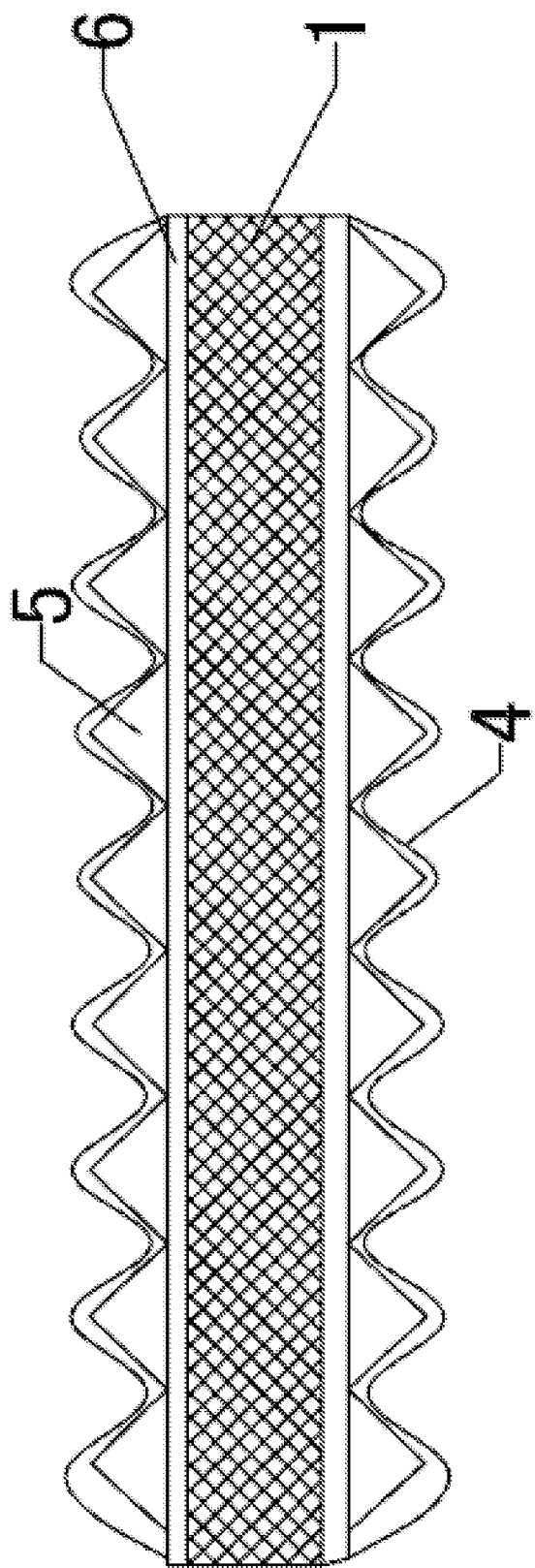
FIG. 3 is a structure diagram of the anti-clogging mesh abrasive cloth with two abrasive layers on both surfaces of the cloth according to an embodiment.

Wherein in the FIGS. 1-3:
1. substrate;
2. large meshes;
3. small meshes;
4. deposited adhesive coating layer;
5. abrasive layer; and
6. prime adhesive coating layer.

DETAILED DESCRIPTION

The invention will be described in greater detail with reference to FIGS. 1-3. The disclosure may be more completely understood in consideration of the following detailed description of various embodiments of the disclosure.

Referring now to FIGS. 1-3, the anti-clogging mesh abrasive cloth comprises a substrate (1), a prime adhesive coating layer (6), an abrasive layer (5) and a deposited adhesive coating layer (4). The prime adhesive coating layer (6) mainly comprises the phenolic resin and the prime adhesive coating layer (6) is painted on the one or more surfaces of the substrate (1). The abrasive layer (5) consists of particles of brown fused alumina and the abrasive layer (5) is planted on the prime adhesive coating layer (6). Painted on the abrasive layer (5) is the deposited adhesive coating layer (4) that mainly comprises the phenolic resin. The substrate (1) of the anti-clogging mesh abrasive cloth is mesh cloth having many large meshes (2) and small meshes (3) alternated with one another. Due to the large mesh weaving structure of the substrate, the chippings generated during the grinding can be discharged in time. In addition, due to the small mesh weaving structure, the plane structures around the large meshes (2) have anti-clogging effect. The diameters of the large meshes (2) of the substrate are 0.1 mm-10 mm, and the diameters of the small meshes (3) of the substrate are 0.01 mm-0.08 mm. The ratio of the numbers of the large meshes (2) and small meshes (3) can be from 1:1 to 1:3. For example, the substrate (1) can include the same numbers of the large meshes (2) and small meshes (3). In another example, the number of the small meshes (3) may be two or three times of the number of the large meshes (2).

The mesh cloth is provided as the substrate (1) of the anti-clogging mesh abrasive cloth, which is made from a cloth selected from the group consisting of nylon cloth, cotton cloth, blending cloth, acrylic cloth, polyester fiber cloth, bonding cloth and linen cloth.

The abrasive layer (5) can be formed by the way of either electrostatic coating or gravity coating.

The shapes of large meshes (2) and the small meshes (3) are the following one or any combination, including circle, ellipse, polygon and irregular shape.

The abrasive layers (5) can be on one surface of the substrate (1), or on the both surfaces of the substrate (1).

On the deposited adhesive coating layer (4) is an anti-clogging coating layer, the main components of which are resin adhesives.

The adhesives of the prime and the deposited adhesive coating layers comprise material selected from the group consisting of phenolic resin, epoxy resin, urea-formaldehyde resin, polyvinyl alcohol (PVA), latex and any combinations thereof.

The one or more abrasive layers (5) comprise material selected from the group consisting particles of brown fused alumina, silicon carbide, calcined brown alumina, semi brittle alumina, diamond, ceramics and any combinations thereof.

The substrate (1) can be processed by resin treatment or mechanical grinding before being used to make the anti-clogging mesh abrasive cloth.

SPECIFIC MANUFACTURING PROCESSES

Exemplary Process 1

The process includes selecting a diamond-shaped mesh cloth as the grey cloth. The grey cloth has a plurality of large meshes with the diameter of 0.1 mm and a plurality of small meshes with the diameter of 0.03 mm. The grey cloth is processed by resin treatment and drying to generate the substrate (1). The resin used in the resin treatment includes resin adhesive, pigment, dispersing agent (or dispersant), penetrating agent (or penetrant) and coupling agent (or coupler). The parts of weight of the above components of the resin are 100, 1, 1, 0.5 and 0.02, respectively. For example, the resin includes 100 parts of resin adhesive, 1 part of pigment, 1 part of dispersing agent, 0.5 part of penetrating agent, and 0.02 part of coupling agent, in weight. The process also includes uniformly painting two prime adhesive coating layers (6) on both sides of the substrate (1) and then planting the abrasive layer (5) on both of the two prime adhesive coating layers (6) via a double-face electrostatic sand planting treatment. The planted abrasive layer (5) is then dried and coated with the deposited adhesive coating layer (4). This exemplary process therefore achieves the anti-clogging mesh abrasive cloth with abrasive layers on both surfaces.

Exemplary Process 2

Similar to the above-described exemplary process 1, this process 2 includes selecting a diamond-shaped mesh cloth as the grey cloth. Differently, in this exemplary process, the mesh cloth has large meshes with the diameter of 0.5 mm and small meshes with the diameter of 0.05 mm. In addition, the grey cloth is processed using immersing treatment. The resin used in the immersing treatment includes resin adhesive, pigment, dispersing agent, penetrating agent, coupling agent. The parts of weight of the above components of the resin are 100, 1, 1, 0.5 and 0.02, respectively. The prime adhesive coating layer (6) is then uniformly painted on a single side of the substrate (1). The abrasive layer (5) is planted on the prime adhesive coating layer (6) on the single side of the substrate (1) using an electrostatic sand planting treatment. The planted abrasive layer (5) is then dried and coated with the deposited adhesive coating layer (4) to obtain the anti-clogging mesh abrasive cloth with an abrasive layer on a single surface.

The above disclosure describes exemplary embodiments of the invention, and not a limitation of the use of this invention or similar products. Any person having ordinary skill in the art can take on various modifications and alterations without departing from the spirit and scope of the disclosure. Accordingly, it is to be understood that the embodiments of the present disclosure to be controlled by the limitations set forth in the claims and any equivalents thereof.

The invention claimed is:

1. An anti-clogging mesh abrasive cloth, comprising:
 a substrate including a plurality of uniformly distributed large meshes and small meshes;
 a prime adhesive coating layer painted on one of the two surfaces of the substrate;
 an abrasive layer planted on the prime adhesive coating layer; and
 a deposited adhesive coating layer covering on top of the abrasive layer.

2. The anti-clogging mesh abrasive cloth of claim 1, wherein the substrate is made from a cloth selected from the group consisting of nylon cloth, cotton cloth, blending cloth, acrylic cloth, polyester fiber cloth, bonding cloth and linen cloth.

3. The anti-clogging mesh abrasive cloth of claim 1, wherein the large meshes and small meshes alternate with one another.

4. The anti-clogging mesh abrasive cloth of claim 3, wherein the shape of large meshes or small meshes is one or any combination of the following shapes including circle, ellipse, polygon and irregular shape.

5. The anti-clogging mesh abrasive cloth of claim 1, wherein the shape of large meshes or small meshes is one or any combination of the following shapes including circular, ellipse, polygonal and irregular shape.

6. The anti-clogging mesh abrasive cloth of claim 1 further comprising another prime adhesive coating layer painted on the other surface of the substrate and another abrasive layer planted on the other prime adhesive coating layer.

7. The anti-clogging mesh abrasive cloth of claim 1 further comprising an anti-clogging coating layer painted on the deposited adhesive coating layer.

* * * * *